Figures 5, 6:
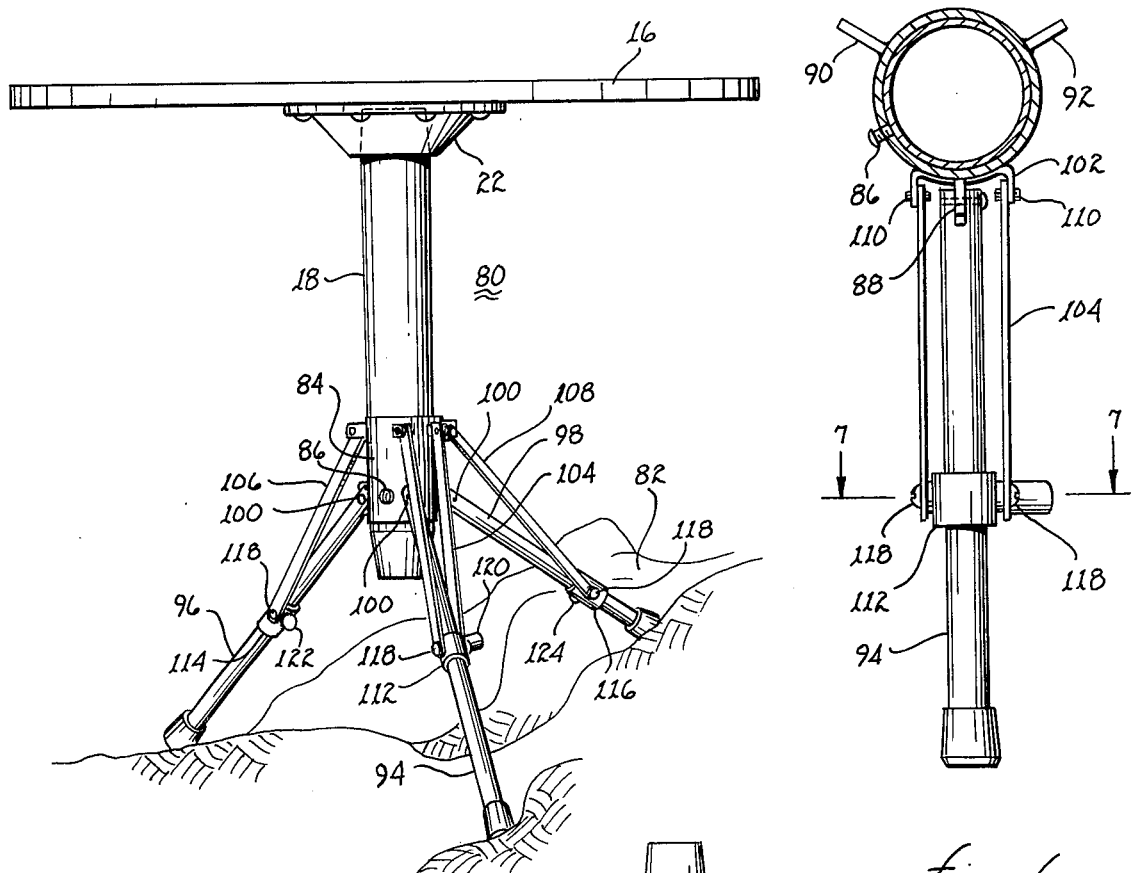

United States Patent [19]

Prest

[11] 4,223,860
[45] Sep. 23, 1980

[54] CONVERTIBLE STAND FOR TABLE TOPS

[76] Inventor: John D. Prest, 1313 6th Ave., Yuma, Ariz. 85364

[21] Appl. No.: 1,197

[22] Filed: Jan. 5, 1979

[51] Int. Cl.² .......................................... F16M 11/38
[52] U.S. Cl. .................................. 248/171; 108/150; 108/157; 248/170; 248/188.6
[58] Field of Search ............... 248/171, 170, 434, 435, 248/188.6, 188.2; 108/150, 157; 5/118

[56] References Cited

U.S. PATENT DOCUMENTS

| 1,008,545 | 11/1911 | Humphrey | 248/171 |
| 2,282,285 | 5/1942 | Olson | 248/188.6 X |
| 2,613,901 | 10/1952 | Tatar | 248/434 X |
| 3,391,660 | 7/1968 | Stewart | 108/150 X |
| 3,738,699 | 6/1973 | Fain | 5/118 X |
| 4,098,478 | 7/1978 | Spitzka | 108/150 X |

FOREIGN PATENT DOCUMENTS

| 881317 | 6/1953 | Fed. Rep. of Germany | 248/171 |
| 2602199 | 7/1977 | Fed. Rep. of Germany | 248/171 |

Primary Examiner—James T. McCall
Attorney, Agent, or Firm—Cahill, Sutton & Thomas

[57] ABSTRACT

Multiple pivotable legs are radially extendable from a pole stand for a table top to permit support of the table top by pivotal extension of the legs for supporting the stand or the legs may be radially collapsed to permit engagement of the lower end of the stand with a fixed recess.

15 Claims, 8 Drawing Figures

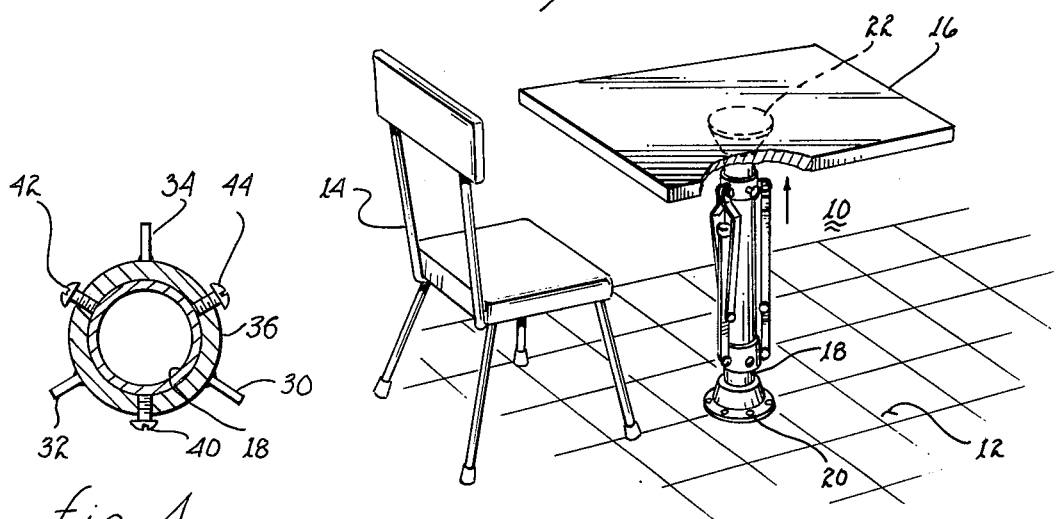
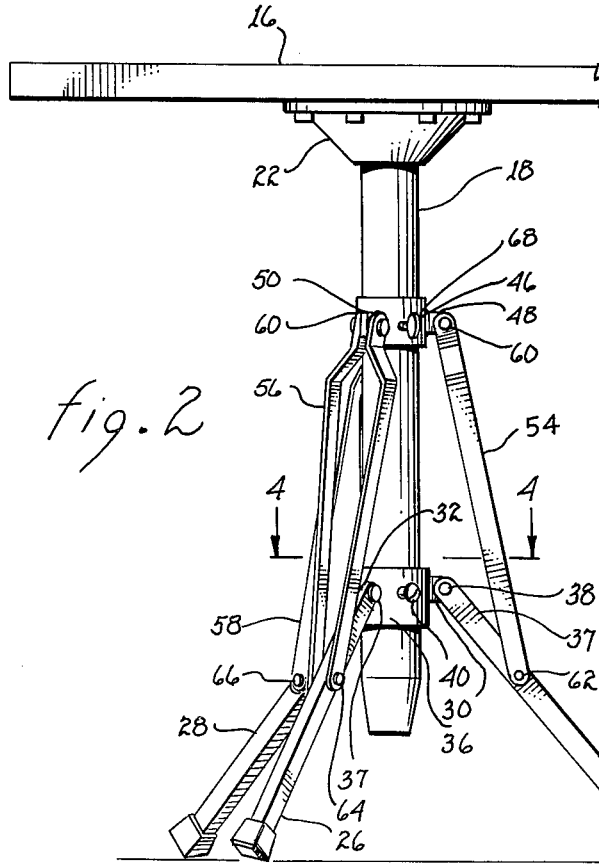

CONVERTIBLE STAND FOR TABLE TOPS

The present invention relates to tables and, more particularly, to stands for table tops.

In recreational vehicles, efficient use of the available space is very important in order to render the vehicle as utilitarian as possible for a variety of activities conducted therein. Consequently, much of the furniture is convertible from one piece of furniture into another. Similarly, many pieces of furniture are of the take down type to permit them to be stored in small spaces when not needed. Usually, the table for a dinette or settee is a table top supported upon a stand made from a length of tubing. The tubing includes necked down ends for mating with a cup shaped member attached to the floor and a similar, but inverted, cup shaped member attached to the center underside of the table. Thus, when the dinette or settee is converted into a bed, the table is removed by disengaging the table top from the tubing and using it for a center support for the bed. The tubing is disengaged from the floor and stored.

Very often, owners and users of recreational vehicles drive to a campsite and stay at the campsite for days or weeks. During such stays, particularly when the weather is mild, eating or other activities requiring a table are performed outside of the recreational vehicle. Such tables must usually be transported to the campsite and are only usable outside of the recreational vehicle. Since these tables can only perform one function, their cost in terms of storage space during transit is quite high.

It is therefore a primary object of the present invention to provide a table for recreational vehicles which is usable as a table within and without a recreational vehicle.

Another object of the present invention is to provide a stand for a table top which is mateable with a fixed anchor point or supportable upon a ground surface.

Yet another object of the present invention is to provide a stand for a table top which is collapsible into a compact unit for storage and useable within and without a recreational vehicle.

Still another object of the present invention is to provide a stand for a table top which stand is supportable by a fixed recess or upon an uneven surface.

A further object of the present invention is to provide a compactible stand for a table top.

A yet further object of the present invention is to provide a lightweight multiple use stand for table tops.

A still further object of the present invention is to provide an inexpensive multiple use stand for table tops.

These and other objects of the present invention will become apparent to those skilled in the art as the description thereof proceeds.

Figure 7:
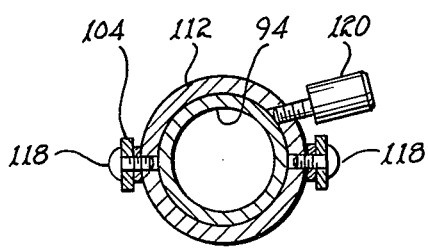
Figure 8:
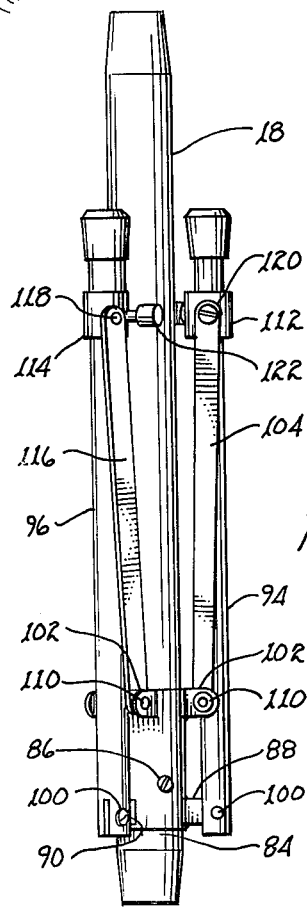

The present invention may be described with greater specificity and clarity with reference to the following drawings, in which:

FIG. 1 is a perspective view of the present invention;
FIG. 2 is an elevational view of the present invention;
FIG. 3 is a top view of a pivotable leg;
FIG. 4 is a cross-sectional view taken along lines 4—4, as shown in FIG. 2;
FIG. 5 is a perspective view of a variant of the present invention located on an uneven surface;
FIG. 6 is a top view of a pivotable leg;
FIG. 7 is a cross-sectional view taken along lines 7—7 as shown in FIG. 6; and
FIG. 8 illustrates the variant in its compacted form.

Outdoor activities, particularly in conjunction with travel by recreational vehicles to camp sites, suggest the desirability of tables for eating purposes, playing cards, etc. Such tables are seldom supported by four legs as the terrain is usually uneven and four legged tables would be unstable. Tables supported by three legs are inherently stable but if the three legs are not adjustable in length, the table surface will usually not be horizontal unless the ground surface is flat.

Most recreational vehicles include a table top supported upon a length of tubing detachably extending from a cup shaped member on the floor to an inverted cup shaped member attached to the center underside of the table top. Such a table is reasonably stable and sufficiently robust for most expected uses. The primary appeal of such a table is, however, its take down features which allows the table top to be removed and used as a shelf or support in conjunction with other structures to form a bed or the like. The tubing, or stand, is desengaged from the floor located member and stored; thereby, the floor space is freed for other uses. A table of this type is not usable outside the recreational vehicle because of the nonavailability of a rigidly fixed cup shaped member for supporting the lower end of the stand.

Referring to FIG. 1, there is shown a representative environment wherein table 10 is fixedly attached to a floor 12 and usable in conjunction with benches or chairs, such as chair 14. The table includes a table top 16 supported upon stand 18. The lower end of the stand is detachably lodged within the recess of fixedly mounted cup member 20 attached to floor 12. A similar, but inverted cup member 22 extends downwardly from the center underside surface of table top 16 for engagement with the upper end of stand 18. The floor space attendant table 10 is readily cleared by disengaging the table top from the stand and the stand from the floor cup member. It is to be understood that the floor cup member may be recessed within the floor and a cover plate may be employed to cover the recess after the stand has been removed. From the above description, it becomes apparent that table 10 is not useable except in conjunction with a floor cup member to receive and support the stand.

To render table 10 useable at locations wherein a floor cup member is not available, three collapsable and pivotally extendable legs 24, 26, and 28 are attached to stand 18, as illustrated in FIGS. 1, 2 and 3. As shown in FIG. 1, these legs, when pivoted into general alignment with stand 18, add little girth to the stand and thereby do not impinge upon the leg space of persons seated at table 10. Moreover, storage of stand 18, after table 10 has been dismantled, requires only slightly greater space when the legs are attached but collapsed than is required by the naked stand.

Legs 24, 26 and 28 are pivotally attached to apertured ears 30, 32 and 34 (see FIG. 4) which extend radially from a stand circumscribing collar 36. These ears mate with a clevis 37 at the upper end of each of the legs, which clevis is suitably configured to allow pivotal attachment by means of a pin (i.e. pin 38). It is to be understood that other than a clevis per se may be used at the upper ends of the legs to pivotally engage the ears. Locking means, such as screws 40, 42 and 44 positionally secure and affix collar 36 to stand 18.

A slidable collar 46 is circumscribingly mounted upon stand 18; this collar may be a duplicate of collar 36. Thumb screws 68, 70 and 72 threadedly engage the collar and interferingly mate with stand 18 to selectively positionally lock the collar along stand 18. Collar 46 also includes a plurality of apertured ears extending radially therefrom. These ears pivotally support the apertured upper ends of links 54, 56 and 58 through pins such as pins 60. The lower ends of links 54, 56 and 58 are pivotally attached to legs 24, 26 and 28 by pins 62, 64 and 66.

In operation, upward sliding of collar 46 draws links 54, 56 and 58 upwardly resulting in upward pivotal movement of legs 24, 26 and 28. Thereby, the legs are positionable essentially adjacent stand 18 and assume a configuration illustrated in FIG. 1. In this position, the legs do not impede the use of stand 18 in the environment shown in FIG. 1. At locations wherein a floor cup member 20 is not available, collar 46 is loosened from about stand 18 and slid downwardly toward collar 36. This movement of collar 46 causes, through rotational translation of links 54, 56 and 58, legs 24, 26 and 28 to pivot downwardly until the rubber tipped ends thereof extend below the lower end of stand 18. Thereafter, collar 46 is positionally secured to the stand by thumb screws 68, 70 and 72. Thus, stand 18 is now stably supportable by the tripod represented by the legs and table top 16, fitted to the upper end of the stand, will be stably supported to serve as a table. Accordingly, stand 18 may be useable with or without floor cup member 20 to support table top 16 upon a variety of surfaces and in different environments.

Referring to FIG. 5, there is shown a variant 80 of the present invention, which variant is particularly suitable when a table is to be used upon an uneven ground surface 82. Table top 16 is attached to the upper end of stand 18 through cup member 22, as described above. A collar 84 is positionally secured to the lower end of stand 18 through a screw 86. Ears 88, 90 and 92 extend radially from collar 84 and pivotaly engage clevis-like ends of legs 94, 96 and 98 through pins, such as pin 100. Three pairs of ears, or three U-shaped fittings 102 (see FIG. 6), are attached to the upper part of collar 84. Each of these fittings pivotally secures the apertured upper ends of the pairs of straps forming links 104, 106 and 108 by means of pins, such as pins 110. The lower ends of each of the links are pivotally secured to collars 112, 114 and 116 circumscribing legs 94, 96 and 98, respectively, by pin means 118. As shown in FIG. 7, each of collars 112, 114 and 116 includes a finger operated locking screw 120, 122 and 124 for lockingly attaching the collars to their respective legs.

In operation, loosening thumb screws 120, 122 and 124 permits upward pivotal movement of each of legs 94, 96 and 98 until the latter are essentialy adjacent stand 18. Such pivotal movement of the legs necessarily produces commensurate sliding movement of collars 112, 114 and 116 along the respective legs and an accompanying pivotal movement of links 104, 106 and 108 until both the links and the arms are essentially adjacent stand 18 as shown in FIG. 8. Thereafter, the thumb screws may be tightened to maintain the legs in place. In this position of the legs, the upper and lower ends of stand 18 are free to engage respective cup members and permit table top 16 to be supported within a recreational vehicle at another location having a floor mounted cup member, as shown in FIG. 1. It may be pointed out that when the legs are collapsed adjacent the stand of variant 80, the stand is readily storeable.

To use table top 16 to form a table useable upon an uneven ground surface 82, the thumb screws 120, 122 and 124 are loosened and the respective legs are pivoted downwardly until the rubber tipped ends thereof extend below the lower end of stand 18. As each leg may be independently pivoted, the effective height of each rubber tipped end may be varied to accommodate the uneven ground surface and thereby maintain table top 16 essentially horizontal. Thereby, variant 80 provides the capability of supporting table top 16 in conjunction with a floor mounted cup member or upon an uneven ground surface.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A multi use stand for supporting table tops, said stand comprising in combination:
   (a) a length of tubing, said tubing having an upper end for engaging and supporting the table top and a lower end for engaging a floor mounted member;
   (b) first collar means for circumscribing said tubing, said first collar means being disposed a sufficient distance from the lower end of said tubing to allow the lower end to engage the floor mounted member;
   (c) at least three legs;
   (d) means for pivotally attaching each of said legs to said first collar means to allow extension of said legs radially from said tubing;
   (e) second collar means for circumscribing said tubing, said second collar means being disposed a sufficient distance from the upper end of said tubing to allow the upper end to engage the table top;
   (f) at least three links;
   (g) means for pivotally securing each of said links to said second collar means; and
   (h) further means for pivotally securing each of said links to one of said legs;

whereby, angular reorientation of said links in a plane radial to the tubing pivotally extends or retracts said legs with respect to said tubing to provide either a three legged stand for supporting the table top upon a surface or a stand for supporting the table top upon the floor mounted member, respectively.

2. The stand as set forth in claim 1 wherein said first collar means includes means for affixing said first collar means to said tubing and said second collar means includes means for repetitively relocating said second collar means along said tubing with respect to said first collar means.

3. The stand as set forth in claim 1 wherein said first and second collar means are affixed to said tubing.

4. The stand as set forth in claim 3 wherein said further securing means comprises third collar means circumscribing each of said legs.

5. A multi use stand for supporting a table top upon a fixed floor mounted cup member or upon a surface, said stand comprising in combination:
   (a) a length of tubing having an upper end for engaging and supporting the table top and a lower end for engaging the floor mounted cup member;
   (b) at least three legs;

(c) means for pivotally attaching each of said legs to said tubing to allow extension of said legs radially from said tubing and to allow retraction of said legs substantially along said tubing, said attaching means being disposed a sufficient distance from the lower end of said tubing to allow the lower end to engage the floor mounted cup member when said legs are retracted;

(d) at least three links;

(e) means for pivotally securing each of said links to said tubing; and (f) further means for pivotally securing each of said links to one of said legs;

(g) each of said legs having a length adapted to allow the upper end of said tubing to engage the table top when each of said legs is retracted substantially along said tubing;

whereby, angular reorientation of said links in a plane radial to said tubing pivotally extends or retracts said legs with respect to said tubing to provide either a three legged stand for supporting the table top upon a surface or a stand for supporting the table top upon the floor mounted cup member, respectively.

6. The stand as set forth in claim 5 wherein said securing means comprises a first collar means circumscribing tubing.

7. The stand as set forth in claim 6 wherein said first collar means includes an ear for pivotally securing each of said links.

8. The stand as set forth in claim 7 wherein said first collar means is slidable along tubing to reorient said links and including lock means for locking said first collar means along tubing to maintain a fixed angular orientation of said legs.

9. The stand as set forth in claim 8 wherein said further securing means comprises a pivotal connection intermediate each of said links with one of said legs.

10. The stand as set forth in claim 9 wherein said attaching means comprises a second collar means circumscribing tubing.

11. The stand as set forth in claim 10 wherein said second collar means includes means for locking said second collar means in place along tubing.

12. The stand as set forth in claim 5 wherein said further securing means comprises third collar means for circumscribing each of said legs, each of said third collar means being slidable along a corresponding one of said legs for pivoting the corresponding one of said legs independently from the remainder of said legs.

13. The stand as set forth in claim 5 wherein said attaching means and said securing means comprises a single collar circumscribing said tubing, said single collar including means for positionally affixing said single collar to said tubing.

14. The stand as set forth in claim 13 wherein said single collar includes an ear for pivotably engaging each of said links and said legs.

15. The stand as set forth in claim 12 wherein each of said third collar means includes lock means for locking each of said third collar means to a corresponding one of said legs.

* * * * *